June 12, 1956    B. GROSS    2,750,069

SEALED JOINT

Filed Aug. 10, 1953

INVENTOR.
B. GROSS
BY
S. Tierney Jr.

United States Patent Office 2,750,069
Patented June 12, 1956

2,750,069

SEALED JOINT

Bernard Gross, San Diego, Calif., assignor to Rohr Aircraft Corporation, Chula Vista, Calif., a corporation of California Application August 10, 1953, Serial No. 373,303

1 Claim. (Cl. 220—46)

This invention relates to improvements in structures which require hermetical sealing and is particularly adapted to the sealing of aircraft structures such as built-in fuel tanks, pressurized cabins, etc.

It is an object of the invention to provide a structure the seams are joints of which may be partly sealed during assembly and the seal completed from the exterior after assembly.

A further object is to provide a joint structure in a tank or other closed container wherein, if leakage should occur due to sealant failure, the seal may be repaired from the exterior without the necessity of disassembly.

Another object is to provide means for sealing the joint between two mating members of a structure wherein there may be poor fitting of the parts due to manufacturing tolerances or other cause.

A further object is to provide a joint structure which will maintain an effective seal under severe stress conditions such as are produced by weaving and vibration of aircraft during flight.

If often happens that two members forming part of a sealed structure are required to have considerable strength, so that each is so thick that it cannot be placed in close registration with the other by means of connecting screws or bolts. Due to manufacturing tolerances when machining the surfaces of the members to be drawn together at the joint, there is not continuous contact of them along the joint. This results in spaces between the members at various places along the joint through which leakage can occur. It is a main purpose of this invention to provide an inexpensive and easily installed sealing means whereby joints of this type may be effectively hermetically sealed.

Further objects will become apparent as the description of the joint proceeds. For a better understanding of the invention, reference is made to the accompanying drawings, in which.

Figure 1:
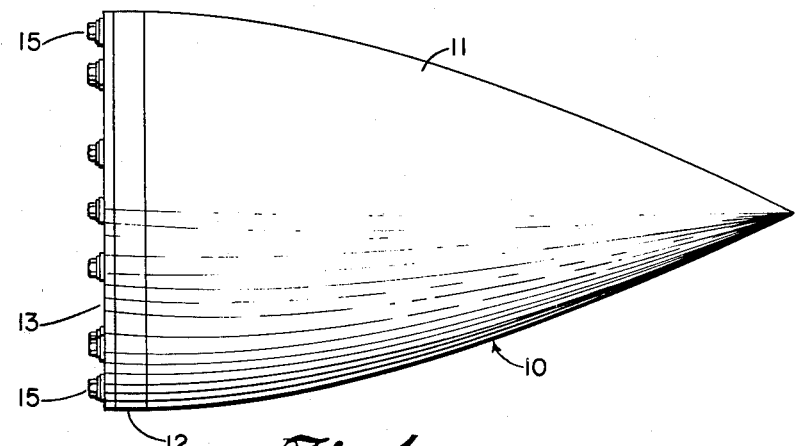
Fig. 1 is a side view of an airplane fuel tank embodying the invention.
Figure 2:
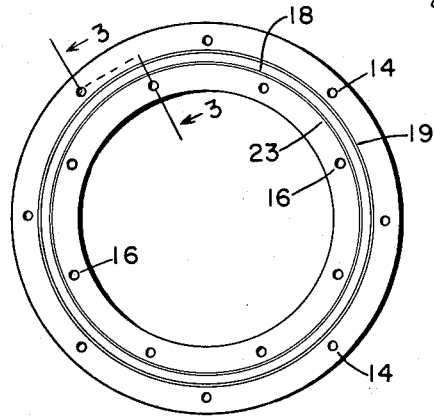
Fig. 2 is an end view of the tank with the bulkhead removed.

The invention is illustrated in association with a hermetically sealed tank 10 adapted to hold gasoline for an airplane, the tank having a curved wall or skin 11 of sheet aluminum to the open end of which is attached by welding a circular metal ring or frame 12. The circular opening in ring 12 is closed by a circular metal bulkhead 13 and the joint between the ring and bulkhead sealed by a construction illustrating the invention. Ring 12 is provided with a series of equally spaced apart threaded holes 14 to receive the threaded ends of bolts 15 which pass through cover 13 and a second series of threaded holes 16 to receive the threaded ends of bolts 17 which also pass through bulkhead 13. Bolts 17 are preferably staggered with reference to bolts 15, as shown. Between the holes 14 and 16 ring 12 is provided with a circular channel 18 to whose outer wall is attached an endless strip or ring 19 made of a resilient material which is insoluble in the liquid to be stored in the tank. For certain liquids rubber, neoprene or other of the known synthetic rubber-like materials is suitable. Ring 19 has a curved peripheral wall 20 to which a rubber cement or other suitable adhesive may be applied to bond it to ring 12 and terminates in an inwardly directed bead 21 which initially extends beyond the outer face 22 of ring 12. A similar resilient ring 23 is bonded to the inner marginal wall 24 of channel 18.

Figure 3:
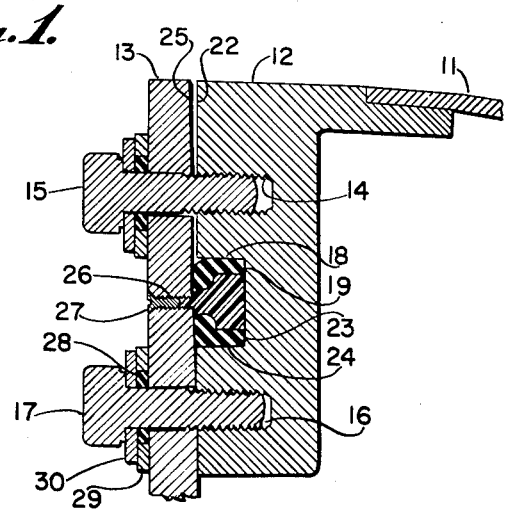
Fig. 3 is a sectional view on an enlarged scale taken on line 3—3 of Fig. 2 showing a portion of the tank and bulkhead in position.
Figure 4:
Fig. 4 is a transverse sectional view of a resilient sealing strip used.
Figure 5:
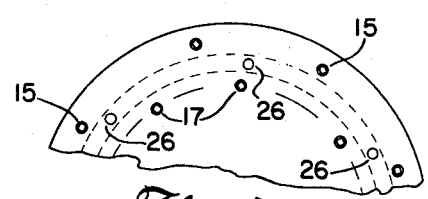
Fig. 5 is an end view of a portion of the tank shown in Fig. 1.

It will be noted that the inner face 25 of bulkhead 13 does not contact the outer face 22 of ring 12 throughout the entire area of face 22, the space between these faces being exaggerated in the drawing for the purpose of clarity. This mismating of the faces is usually due to the tolerances necessary in manufacture of the parts but may be due to warpage of one of them after machining or other reason. According to the invention provision is made for the injection of a resilient sealant material into channel 18 from outside the tank. For this purpose a set of equally spaced apart threaded holes 26 are provided through cover 13 opposite the center of channel 18. When the bolts 15, 17 are tightened to draw bulkhead 13 against ring 12, the beads 21 are bent over and compressed into sealing contact with the bulkhead, as shown in Fig. 3. The tip of a gun containing plastic sealant compound is then inserted into one of the holes 26 and the gun operated, the plastic sealant filling the space in channel 18 between rings 19 and 23 and forming a continuous band or area of contact with the face 25 of cover 13. When the sealant commences to discharge from the next hole 26, a screw 27 is then threaded into the first hole and sealant similarly injected into the next hole. This process is continued around the series of holes 26 until a continuous ring of sealant fills the space in channel 18 and completes the seal. Any suitable plastic sealant compound may be used which can be injected from a pressure gun, a sealant being chosen which is insoluble in the fluid to be stored in the tank and flows well at the temperature of the sealant being injected.

Leakage along the shanks of the bolts is prevented by the fastener sealing means disclosed in my United States Patent No. 2,396,005. This construction utilizes an O ring 28 of resilient material disposed within a thin metal washer 29 and a second washer 30 under the head of the bolt. The O rings are preferably formed of material which is insoluble in the fluid in the tank. While bolts have been illustrated as the means for securing bulkhead 13 to the tank, it will be understood that other known types of fasteners such as screws or rivets may be used instead.

While a circular joint has been illustrated between bulkhead 13 and ring 12, it will be understood that where the members to be joined are rectangular or other shape, the channel 18 will be correspondingly shaped. Also in certain installations one row of bolts or other fasteners, such as the outer set of bolts 15, may be adequate to secure the bulkhead 13 in place. In this event the inner bolts 17 and the holes in bulkhead 13 and ring 12 to receive them may be omitted. If during repair or other operation some sealant should escape from the joint, this may be easily replaced from the outside of the tank by merely removing two or more of the screws 27 and injecting more sealant in the manner above described. The preferred sealant does not set with age but remains plastic and adheres strongly to the parts joined so that slight weaving movement of one part with reference to the other due to motion of the airplane does not break the seal. While the invention has been illustrated in connection with a tank for holding liquid, it will be understood that its use is not so limited but that it may be used in the joint between any two members which requires to be hermetically sealed.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claim, and all changes which come within the meaning and range of equivalency of the claim are intended to be embraced therein.

Having thus described my invention, what I claim as new and useful and desire by Letters Patent is:

A hollow container terminating at one end in an inwardly extending rigid frame having a central opening of large area, the end face of said frame being substantially plane and having a continuous deep groove of substantial width surrounding said opening and said frame having a plurality of spaced apart threaded openings terminating in its end face and disposed outwardly of said groove; a rigid impervious cover having an inner face adapted to seat against the end face of said frame and cover said groove and central opening; a first ring of resilient material secured to and in contact with the inner marginal wall of said groove throughout the entire length of said marginal wall; a second ring of resilient material having a length substantially greater than the length of said first ring, said second ring being secured to and in contact with the outer marginal wall of said groove throughout the entire length of said outer wall, each of said rings being composed of material substantially softer than that composing said frame and cover and each having a curved end portion extending beyond the end face of said frame; a plurality of fasteners passing through said cover and having ends in threaded engagement with said threaded openings, the tightening of said fasteners drawing said cover against the end face of said frame and also the curved end portions of said rings to compress said curved portions into sealing contact with said cover while leaving said curved end portions spaced apart, said cover having extending therethrough a plurality of spaced apart threaded openings terminating between the curved ends of said rings; a continuous mass of plastic sealant filling the space between said rings, said cover and the bottom of said groove; and a plurality of screws threaded into said threaded openings in said cover, said screws being removable by an operator located outside the container.

References Cited in the file of this patent

UNITED STATES PATENTS

| | | |
|---|---|---|
| 1,590,580 | Hume | June 29, 1926 |
| 1,978,607 | Straty | Oct. 30, 1934 |
| 2,013,666 | Nelson | Sept. 10, 1935 |
| 2,133,487 | Spargo | Oct. 18, 1938 |
| 2,485,497 | Lemley et al. | Oct. 18, 1949 |
| 2,504,936 | Poyne | Apr. 18, 1950 |
| 2,582,518 | Works | Jan. 15, 1952 |
| 2,691,460 | Barnebey | Oct. 12, 1954 |